United States Patent [19]
Mori

[11] 3,974,490
[45] Aug. 10, 1976

[54] PAPER ROLL DIAMETER SENSING DEVICE FOR USE WITH PAPER SPLICING APPARATUS

[75] Inventor: Yasuharu Mori, Amagasaki, Japan

[73] Assignee: Rengo Co., Ltd., Osaka, Japan

[22] Filed: July 26, 1974

[21] Appl. No.: 492,172

[30] Foreign Application Priority Data
June 1, 1974  Japan.................................. 49-62267

[52] U.S. Cl. ........................... 340/268; 235/92 CA; 242/57; 242/58.1; 307/123; 317/6; 324/161; 340/259; 340/263
[51] Int. Cl.²......................................... G08B 21/00
[58] Field of Search ........... 340/268, 259, 263, 271; 324/161; 242/57, 58.1; 307/123; 317/6; 235/92 CA

[56] References Cited
UNITED STATES PATENTS

| | | | |
|---|---|---|---|
| 3,161,365 | 12/1964 | Johnson et al......................... | 242/57 |
| 3,232,548 | 2/1966 | Bent et al. .......................... | 242/58.1 |
| 3,298,622 | 1/1967 | Raymond et al.................... | 242/58.1 |
| 3,352,023 | 11/1967 | Budnick........................... | 324/161 X |
| 3,518,857 | 7/1970 | Hancock et al................... | 242/57 X |
| 3,775,223 | 11/1973 | Moseley et al..................... | 242/57 X |
| 3,834,648 | 9/1974 | Rose et al........................ | 242/57 X |

*Primary Examiner*—David L. Trafton
*Attorney, Agent, or Firm*—Stewart and Kolasch, Ltd.

[57] ABSTRACT

A paper roll diameter sensing device for use with a paper splicing apparatus is disclosed which gives the output signal when the diameter of an unrolled paper roll is reduced to a predetermined diameter so that the running paper web may be spliced to the leading end of a new paper roll.

6 Claims, 20 Drawing Figures

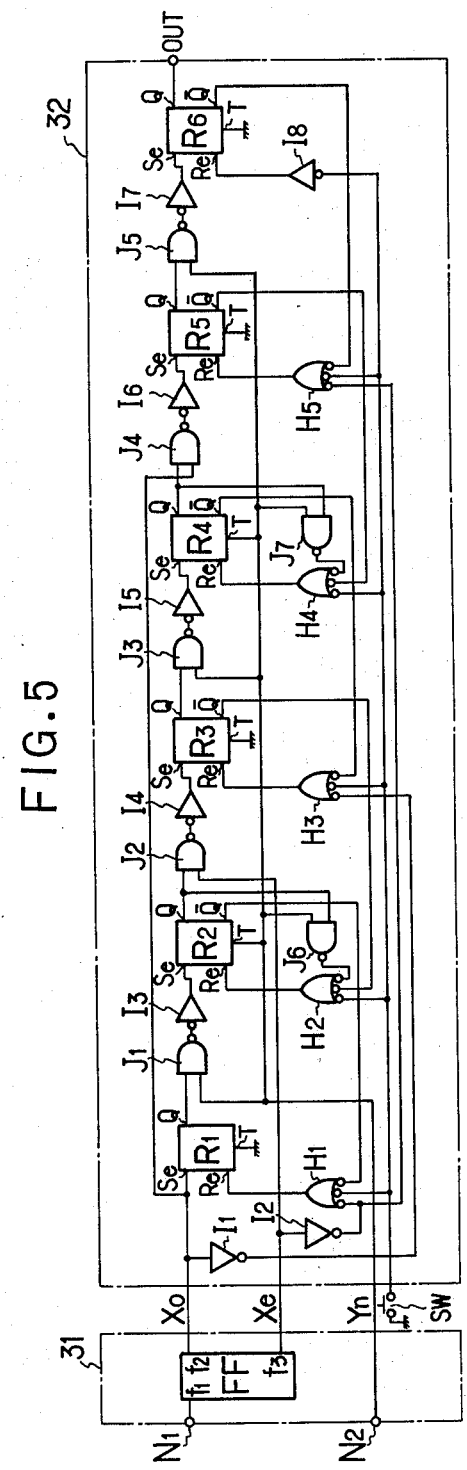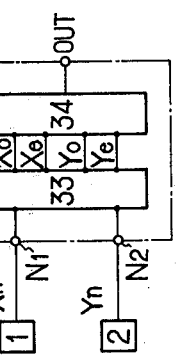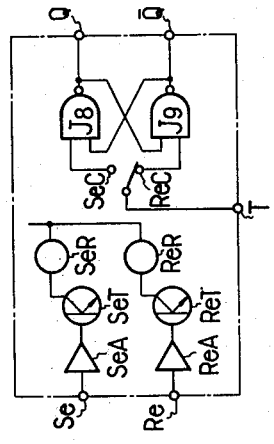

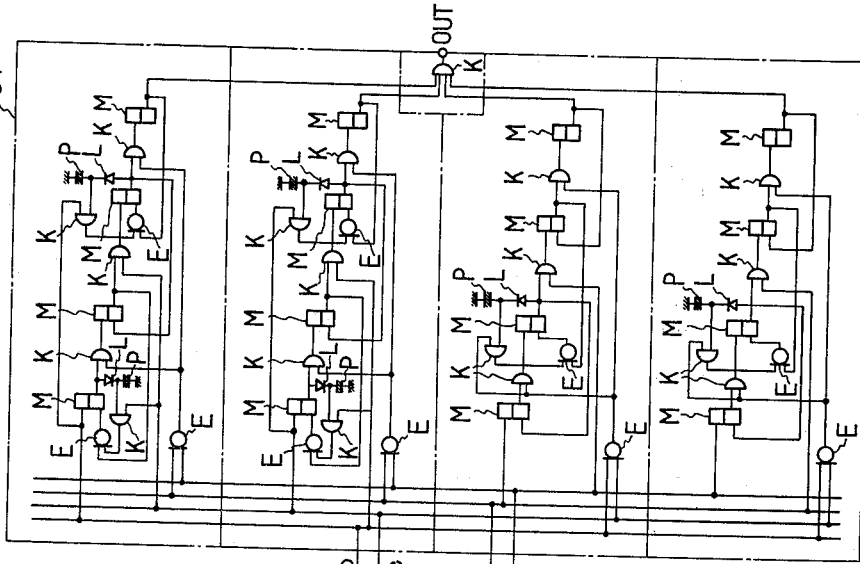
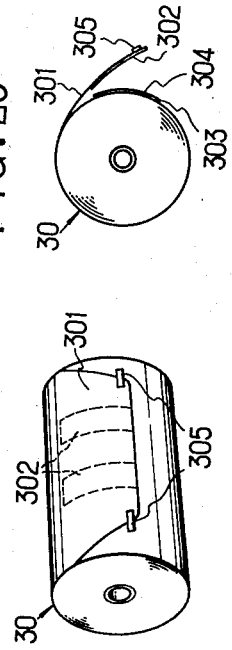
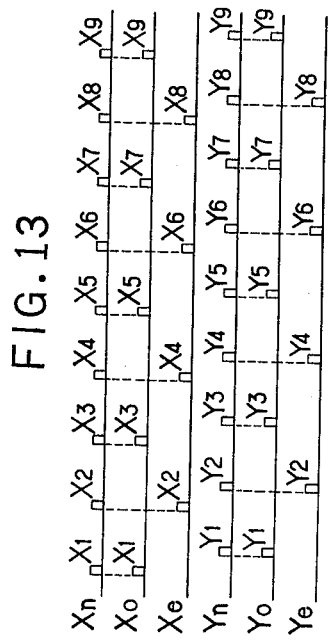
FIG.13 FIG.14 FIG.15 FIG.16 FIG.17 FIG.18 FIG.19 FIG.20

PAPER ROLL DIAMETER SENSING DEVICE FOR USE WITH PAPER SPLICING APPARATUS

The present invention relates to generally a device for sensing a predetermined reduced diameter of a paper roll unrolled on a paper splicing apparatus, and more particularly a sensing device for sensing the reduction of the diameter of a paper roll unrolled to a predetermined diameter for use with a paper splicing apparatus of the type in which a pair of rolls of, for instance, liner paper or medium paper for corrugated board are rotatably carried by a paper roll supporting stand and when one paper roll is unrolled to a predetermined diameter, the running paper web is spliced to the leading end of the other unrolled paper roll.

It is imperative to sense the reduction of an unrolled paper roll to a predetermined diameter at a highest speed as possible because the running paper sheet or web must be spliced to the leading end of a new paper roll immediately before the paper on the unrolled paper roll is exhausted.

One of the objects of the present invention is therefore to provide a device capable of sensing the reduction to a predetermined diameter of an unrolled paper roll supported by a paper roll supporting stand of a paper splicing apparatus with a higher degree of accuracy and at a high speed.

The above and other objects, features and advantages of the present invention will become more apparent from the following description of preferred embodiments thereof taken in conjunction with the accompanying drawing in which:

FIG. 5 is a detailed block diagram of the selector circuit and a discriminator circuit of the first embodiment;

FIGS. 6 to 11 are diagrams of the component circuits thereof used for the explanation of their modes of operation;

FIG. 12 is a block diagram of a second embodiment of the present invention;

FIG. 13 shows the pulse trains derived from a selector circuit thereof when the diameter of an unrolled paper roll approaches a predetermined diameter;

FIG. 14 is a detailed block diagram of the selector circuit an a discriminator circuit of the second embodiment;

FIGS. 15 to 18 are views used for the explanation of the component parts thereof;

FIG. 19 is a perspective view of a new paper roll; and

FIG. 20 is a side view thereof when the leading end is separated from the body of the paper roll.

Figure 3:
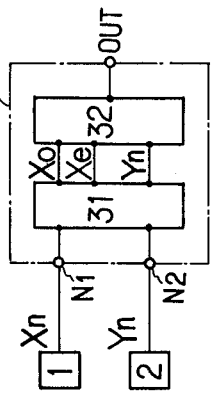
FIG. 3 is a block diagram of a first embodiment of the present invention.

Referring to FIGS. 1 to 11, one example of a paper splicing apparatus to which is applied the present invention and the first embodiment thereof will be described hereinafter. A paper splicing apparatus of the type shown in FIGS. 1 and 2, comprises a main frame 5 which extends horizontally above a stand 4 adapted to support rotatably two paper rolls at the front and rear sides, respectively, and whose front or rear end 51 or 52 is pivoted so that the rear or front end 52 or 51 may swing; an auxiliary frame 6 mounted upon the main frame 5 for reciprocal movement; a front splicing roll 61 rotatably carried by the auxiliary frame 6; a rear splicing roll 62 rotatably carried by the auxiliary frame 6 in parallel with the front splicing roll 62; a first auxiliary splicing roll 72 carried by the main frame 5 at its front end 51 in such a way that when the auxiliary frame 6 moves to the front end 51 of the main frame 5 the auxiliary splicing roll 71 may contact with the rear splicing roll 62; a second or rear auxiliary splicing roll 72 carried rotatably by the main frame 6 at its rear end 52 in such a way that when the auxiliary frame 6 moves to the rear end 52, the second or rear auxiliary splicing roll 72 may contact with the front splicing roll 61; a device 81 for driving a new paper roll including an endless belt 811 adapted to contact with the new roll supported at the front side of the stand 4 so as to rotate the new roll at the same speed with the speed at which the paper sheet is unrolled from a paper roll; a second or rear device 82 for driving a new paper roll including an endless belt 821 adapted to contact with the new paper roll supported at the rear side of the stand 4 so as to rotate the new paper roll at the same speed with the speed at which the paper sheet is unrolled from a paper roll; a first or front knife 91 extended from the front side of the auxiliary frame 6; a second or rear knife 92 extended backwardly from the rear end of the auxiliary frame 6; a third knife 93 pivotably carried by the main frame 5 in such a way that when the auxiliary frame 6 moves to the front end 51 of the main frame, the third knife 93 may rotate in the clockwise direction immediately above the second or rear knife 92, thereby cutting off the running paper sheet; and a fourth knife 94 pivotably carried by the main frame 5 in such a way that when the auxiliary frame 6 moves to the rear end 52 of the frame 5, the fourth knife 94 may rotate in the counterclockwise direction immediately above the first or front knife 91, thereby cutting off the running paper sheet.

Figure 1:
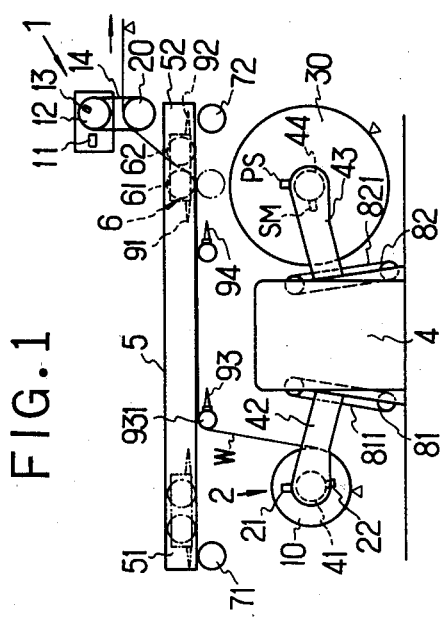
FIG. 1 is a schematic side view of one example of a paper splicing apparatus to which is applied the present invention.
Figure 2:
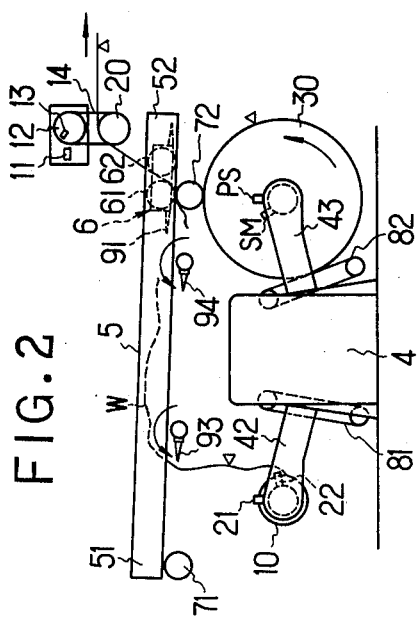
FIG. 2 is a view similar to FIG. 1 illustrating that the running paper web is spliced to the leading end of a new paper roll and the undesired trailing end portion of the running paper web is cut off.

In FIG. 1 the auxiliary frame 6 is shown as being located at the rear end 52 of the main frame 5 while the paper roll 10 supported at the front side of the stand 4 is unrolled. The paper sheet or web W is transported in contact with a supporting shaft 93 of the third knife 93, passing between the first and fourth knives 91 and 94 and through the nip between the splicing rolls 61 and 62. A new paper roll 30 is supported at the rear side of the stand 4.

The first embodiment of a sensing device in accordance with the present invention comprises a guide roll 20, a first pulse generator 1, a second pulse generator 2, and a circuit 3 (FIG. 3) adapted to compare the pulserepetition rates of the pulses generated by the first and second pulse generators 1 and 2 so that when they coincide with each other, a predetermined output signal may be derived.

The guide roll 20 is rotatably disposed immediately above the rear end 52 of the main frame 5, and the paper sheet or web W unrolled from the paper roll 10 is wrapped around the guide roll 20.

As shown in FIG. 1, the first pulse generator 1 comprises a proximity switch including a sensor 11, a disk-shaped rotary member 12, and a sensor pin or actuator 13 extended from the disk-shaped rotary member 12 and adapted to move toward and away from the sensor 11 as the disk-shaped rotary member 12 rotates. The rotary member 12 is so coupled with a belt 14 to the guide roll 20 as to rotate at the same rotational speed with that of the guide roll 20. The second pulse generator 2 comprises a proximity switch including a sensor 21, and a sensor pin or actuator 22 carried by the paper roll for movement toward or away from the sensor 21. The sensor pin or actuator 22 of the second pulse generator is carried by a rotary shaft 41 of the paper roll 10 which in turn is rotatably carried by the stand 4 while the sensor 21 is carried by an arm 42 extended from the stand 4 for supporting the shaft 41.

The first pulse generator 1 generates one pulse every time when the guide roll 20 makes one rotation while the second pulse generator 2 generates one pulse every time when the paper roll 10 makes one rotation. Therefore, a predetermined diameter of the paper roll 10 to be sensed is equal to the diameter of the guide roll 20. A desired diameter of the paper roll to be detected may be varied easily by varying the rotational speed ratio between the guide roll 20 and the rotary member 12 in a manner well known in the art.

Next referring to FIG. 3, the circuit 3 which compares the pulse train $Xn$ ($X1, X2, X3, \ldots$) from the first pulse generator 1 and the pule train $Yn$ ($Y1, Y2, Y3, \ldots$) from the second pulse generator 2 to give the output signal, comprises a selector 31 adapted to divide the pulse train $Xn$ into an odd-numbered pulse train $Xo$ ($X1, X3, X5, \ldots$) and an even-numbered pulse train $Xe$ ($X2, X4, X6, \ldots$) and to pass therethrough the pulse train $Yn$ without any change in the order of the pulses, and a discriminator 32 adapted to compare the sequences of the pulses of the pulse trains $Xo$, $Xe$ and $Yn$ (FIG. 4) so that when the pulse-repetition rates of the pulses generated by the first and second pulse generators 1 and 2, respectively, coincide with each other, the output signal may be generated. The details of the selector 31 and the discriminator 32 are shown in FIG. 5.

Referring to FIG. 5, the selector 31 comprises a flip-flop FF. The mode of operation of the flip-flop FF will be described with particular reference to FIG. 6. When the input $f1 = 1$ is applied to the flip-flop FF when the output $f2 = 0$ while the NOT output $f3 = 1$, $f2$ becomes 1 while $f3$ becomes 0. When the next input $f = 1$ is applied, $f2$ becomes 0 while $f3$ becomes 1. In other words, everytime when one input pulse is applied to the input terminal $f1$, the outputs at the output terminals $f2$ and $f3$ are reversed.

Referring back to FIG. 5, the discriminator generally indicated by the numeral 32 includes five NOR gates H1 through H5 whose mode of operation will be described with particular reference to FIG. 8. The output is logic 1 if at least one of the inputs is logic 0 and the output is logic 0 only if all the inputs are logic 1. That is, when the inputs $h1 = h2 = h3 = 1$, then the output $h4 = 0$, and if any of the inputs $h1$, $h2$ and $h3$ is logic 0, the output $h4 = 1$. The discriminator 32 further includes NAND gates J1 through J7 whose mode of operation will be described with particular reference to FIG. 9. If all the inputs $j1$ and $j2$ are logic 0, the output $j3$ is logic 1, but if either of or both of the inputs are logic 0, the output $j3$ is logic 1. The discriminator 32 further includes inverters I1 through I8 whose mode of operation will be described with particular reference to FIGS. 7 and 10. When the input $i1$ is logic 1, the output $i2$ is logic 0, but if the input $i1$ is logic 0, the output is logic 1. The discriminator 32 further includes a reset switch SW for resetting the discriminator 32, and flip-flops R1 through R5 whose detail is shown in FIG. 11. Referring to FIG. 11, each of the fip-flops R comprises an output terminal Q, a NOT output terminal $\overline{Q}$, a set input terminal Se, a reset input terminal Re, a trigger terminal T, amplifiers SeA and ReA, transistors SeT and ReT, relays SeR and ReR, fixed relay contacts SeC and ReC, and NAND gates J8 and J9. When the set input Se = 1 and the reset input Re = 0 while the trigger input T = 0, the output Q = 1 while the NOT output $\overline{Q}$ = 0. Thereafter, the flip-flop R remains in the above state even when the set input Se = 0. However, when the reset input Re = 1 is applied, the output Q becomes 0 while the NOT output $\overline{Q}$ reverses to 1. The flip-flop R may be maintained in the above state even when the reset input Re = 1 disappears.

Figure 4:
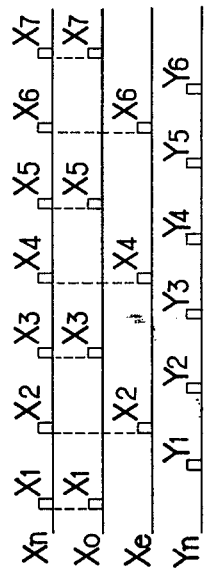
FIG. 4 shows the pulse trains derived from a selector circuit shown in FIG. 3 as the diameter of an unrolled paper roll approaches a predetermined diameter.

When the diameter of the unwinding paper roll 10 becomes closer to the diameter of the guide roll, i.e. a predetermined diameter, the rotational speed of hte sensor pin or actuator 22 of the second pulse generator becomes closer to that of the sensor pin or actuator 13 of the first pulse generator. Therefore, the pulse-repetition rate of the pulses generated by the second pulse generator 2 becomes closer to that of the first pulse generator 1. The discriminator 32 discriminates whether or not the pulses are generated in a manner as shown in FIG. 4.

As is apparent to those skilled in the art from FIG. 5, the discriminator 32 starts counting first the pulse of the odd-numbered pulse train $Xo$, then the pulse of the pulse train $Yn$, the pulse of the even-numbered pulse train $Xe$, the pulse of the pulse train $Yn$, the pulse of the odd-numbered pulse train $Xo$, and the pulse of the pulse train $Yn$. When the discriminator 32 counts six pulses in the order described above, the pulse-repetition rates of the pulses generated by the first and second pulse generators 1 and 2 are discriminated as being coincident with each other so that the discriminator 32 gives the output OUT, representing that the diameter of the paper roll 10 has reduced to a predetermined diameter.

In the instant imbodiment, the pulse-repetition rates of the pulses generated by the first and second pulse generators 1 and 2 are considered to be coincident with each other when the discriminator 32 has counted six pulses in the manner described above, but it is obvious to those skilled in the art that the coincidence of the pulse-repetition rates may be detected with a higher degree of accuracy when more than six pulses are counted. However, it is satisfactory in practice to count until the sixth pulse.

The second embodiment of the present invention is substantially similar in construction to the first embodiment described hereinbefore except that the circuit 3 is different in construction from the circuit 3 of the first embodiment. Referring to FIG. 12 the circuit 3 of the second embodiment comprises a selector 33 adapted to divide the pulse train $Xn$ ($n = 1,2,3, \ldots$) from the first pulse generator 1 into the odd-numbered pulse train $Xo$ ($X1, X3, X5, \ldots$) and the even-numbered pulse train $Xe$ ($X2, X4, X6, \ldots$) and also to divide the pulse train $Yn$ from the second pulse generator 2 into the odd-numbered pulse train $Yo$ ($Y1, Y3, Y5, \ldots$) and the even-numbered pulse train $Ye$ ($y2, Y4, Y6, \ldots$); and a discriminator 34 adapted to give the output when the pulse-repetition rates of the pulses generated by the first and second pulse generators 1 and 2, respectively, coincide with each other. The various pulse trains are shown in FIG. 13. The details of the selector 33 and the discriminator 34 are shown in FIG. 14.

Referring now to FIG. 14, the selector 33 includes flip-flops B whose mode of operation will be described with particular reference to FIG. 15. When the pulse is applied to the input terminal $b1$, and when the next input pulse is applied to the input terminal, the output is derived from the output terminal $b3$. In other words, the pulse outputs are derived alternately from the output terminals $b2$ and $b3$ when the pulse inputs are applied to the input terminal $b1$. The outputs of the flip-flop B are applied to differentiators C.

The discriminator 34 includes OR gates whose mode of operation will be described with particular reference to FIG. 16. The output $e3$ is logic 0 only if both the inputs $e1$ and $e2$ are logic 0, and is logic 1 if either of the inputs $e1$ or $e2$ is logic 1. The discriminator 32 further includes memories M whose mode of operation will be described with particular reference to FIG. 17. The output $m3$ is logic 1 if the set input $m1$ is logic 1 while the reset input $m2$ is logic 0, and remains logic 1 while the reset input $m2$ is logic 0, and remains logic 1 even when the set input $m1$ reverses to logic 0 as far as the reset input $m2$ remains logic 1. However, when the reset input $m2$ reverses to logic 1, the output $m3$ becomes logic 0. The discriminator 34 also includes AND gates K whose mode of operation will be described with particular reference to FIG. 18. The output $K3$ is logic 1 if both the inputs $K1$ and $K2$ are logic 1, but is logic 0 if either of the inputs $K1$ or $K2$ is logic 1. In addition to the above logic gates, the discriminator 34 further includes diodes L and capacitors P.

As with the case of the first embodiment, when the diameter of the unrolling paper roll 10 approaches a predetermined diameter, the pulse-repetition rates of the pulses generated by the pulse generators 1 and 2 become closer to each other, and the pulses appear alternately as shown in FIG. 13. The discriminator 34 is adapted to discriminate whether or not the pulses are generated in a manner shown in FIG. 13.

As is clear to those skilled in the art, the discriminator 34 may start counting the pulse of any of the pulse trains Xo, Xe, Yo and Ye, and gives the output when the pulses are applied to the discriminator 34 in one of the eight sequences shown below:

1. pulse of Xo, pulse of Yo, pulse of Xe, pulse of Ye, pulse of Xo, pulse of Yo and pulse of Xe;
2. pulse of Xo, pulse of Ye, pulse of Xe, pulse of Yo, pulse of Xo, pulse of Ye, and pulse of Xe;
3. pulse of Xe, pulse of Yo, pulse of Xo, pulse of Ye, pulse of Xe, pulse of Yo, and pulse of Xo;
4. pulse of Xe, pulse of Ye, pulse of Xo, pulse of Yo, pulse of Xe, pulse of Ye, and pulse of Xo;
5. pulse of Yo, pulse of Xo, pulse of Ye, pulse of Xe, pulse of Yo, pulse of Xo, and pulse of Ye;
6. pulse of Yo, pulse of Xe, pulse of Ye, pulse of Xo, pulse of Yo, pulse of Xe, and pulse of Ye;
7. pulse of Ye, pulse of Xo, pulse of Yo, pulse of Xe, pulse of Ye, pulse of Xo, and pulse of Yo; and
8. pulse of Ye, pulse of Xe, pulse of Yo, pulse of Xo, pulse of Ye, pulse of Xe, and pulse of Yo.

In the first and second embodiments, the selectors 31 and 33 and the discriminators 32 and 34 have been described as comprising the logic gates or elements, but it is to be understood that they may comprise noncontact elements or contact elements without departing the true spirit of the present invention.

The output OUT derived from the sensing device in accordance with the present invention when the diameter of the unwinding paper roll decreases to a predetermined diameter is used to actuate the devices 82 for driving a new paper roll 30 in the paper splicing apparatus of the type shown in FIG. 1. Referring back to FIG. 1, a sensor PS of a proximity switch is attached at the leading end of an arm 43 supporting the new paper roll 30, and a sensor actuator SM is attached to a shaft 44 for supporting the paper roll for actuating the sensor PS. The functions of the sensor PS and the sensor actuator SM will become more apparent in the following description of the mode of operation of the paper splicing apparatus.

Referring to FIGS. 1 and 2 again, the mode of splicing the leading end of the paper sheet or web unrolled from the new paper roll 30 to the running paper sheet or web W will be described. The outer surfaces of the paper wheels or webs unrolled from the paper rolls 10 and 30 are the back of the paper as indicated by Δ.

Referring to FIGS. 19 and 20, two double-sided adhesive tapes 302 attached to the inner surface of the leading end portion of the new paper roll 30 are also attached to the non-adhesive surfaces of single-sided adhesive tapes 304 bonded to the outer surface of the new paper roll 30 immediately below the leading end portion, and the leading end is also bonded to the outer surface of the paper roll 30 with small double-sided adhesive tapes 305.

Referring back to FIGS. 1 and 2, as the diameter of the paper roll 10 reduces, the auxiliary splicing roll 72 is made into contact with the front splicing roll 61, and the rear end of the main frame 5 is lowered so that the splicing roll 72 may be located immediately above the new paper roll 30. The sensing device in accordance with the present invention is energized at least after the splicing roll 72 is placed immediately above the new paper roll 30. When the diameter of the paper roll 10 reduces to a predetermined diameter, the sensing device gives the output signal so that the device 82 is energized. The new paper roll 30 is rotated in the counterclockwise direction, and when the sensor actuator SM attached upon the paper roll supporting shaft 44 approaches the sensor PS for the second time, the rear end 52 of the main frame 5 is automatically lowered further so that the auxiliary splicing roll 72 is made into contact with the new paper roll while the paper sheet or web W passes through the nip between the splicing rolls 61 and 72. When the leading end 301 reaches the roll 72 after the latter has been made into contact with the new paper roll 30, the tapes 305 adhere to the roll 73 so that the leading end 301 is wrapped around the splicing roll 72. Thereafter the adhesive tapes 302 at the leading end portion of the new tape roll adhere to the running sheet or web W so that the leading end 301 is transported with the running sheet or web W. When the sensor actuator SM actuates the sensor PS again, the knives 93 and 94 are rotated in the counterclockwise direction through about 180° so that the sheet or web W unrolled from the old paper roll 10 is cut off. When the splicing is completed, the driving device 82 is de-energized and the main frame 5 is returned to its normal position shown in FIG. 1.

When the outer surface of the paper roll 30 is the top surface of paper, double-sided adhesive tapes are bonded to the outer surface of the leading end 301 of the new paper roll 30, and the leading end 301 is temporarily bonded to the main body of the new paper roll in such a way that the leading end 301 may be easily unrolled or picked up in case of the splicing. The new paper roll 30 is rotated in the clockwise direction in FIG. 2 so that the running paper sheet or web W may be directly made into contact with and bonded to the leading end under the pressure of the splicing roll 61 without using the auxiliary splicing roll 72.

In order to splice the running paper sheet or web unrolled from the paper roll 30 to the leading end of the paper sheet or web unrolled from a new paper roll (not shown) supported by the arms 42 of the stand 4, the auxiliary frame 6 is displaced to the front end 51 of the main frame 5 so that the splicing may be accomplished by the splicing roll 62, the auxiliary splicing roll 71, the driving device and the knives 92 and 93 in a manner substantially similar to that described hereinbefore. In this case, the sensor PS of the proximity switch and the sensor actuator SM may be employed as the component parts of the second pulse generator 2 while the sensor 21 of the proximity switch and the sensor actuator 22 may be used as means adapted to give the output signals for lowering the front end 51 of the main frame 5 and for energizing the knife 93.

What is claimed is:

1. A paper roll diameter sensing device for use with paper splicing apparatus of the type splicing the running paper sheet or web unrolled from one paper roll supported by a paper roll supporting stand to the leading end of another paper roll which is also supported by said paper roll supporting stand and which has not yet unrolled, said paper roll diameter sensing device comprising;
    a guide roll adapted to rotate in contact with the running paper sheet or web unrolled from said one paper roll;
    first pulse generator means responsive to the rotation of said guide roll to generate one pulse for each rotation of said guide roll in the provision of a first pulse train having a pulse repetition rate indicative of a predetermined roll diameter at a given velocity of said web;
    second pulse generator means responsive to the rotation of said one paper roll to generate one pulse for each rotation of said one paper roll in the provision of a second pulse train having a pulse repetition rate indicative of the varying diameter of said one paper roll at said given velocity of said web; and
    electrical means responsive to said first and second pulse trains to generate an output signal when the pusle repetition rates of said first and second pulse trains are coincident to indicate the reduction of the varying diameter of said one paper roll to said predetermined diameter, said electrical means comprising a selector circuit means responsive to at least one of said pulse trains to divide the said one of said pulse trains from one of said first and second pulse generator means into an odd-numbered pulse train and an even-numbered pulse train, the pulses of which occur in regular sequential alternation one with the other; and
    a discriminator circuit means responsive to said pulse trains as modified by said selector circuit means generating said output signal when the pulses in said respective pulse trains occur in a predetermined alternating sequence with one another over a predetermined consecutive number of pulses in said respective pulse trains, said predetermined alternating sequence occurring when the pulse repetition rate of the pulses generated by said first pulse generator means coincides that of the pulses generated by the second pulse generator means.

2. A paper roll diameter sensing device as defined in claim 1, wherein said electrical means includes circuit means generating said output signal in response to predetermined alternate sequential occurrences of selected consecutive pulses in said first and second pulse trains;
    said predetermined alternate sequential occurrences being indicative of the coincidence of said pulse repetition raes of said first and second pulse trains.

3. A paper roll diameter sensing device for use with paper splicing apparatus of the type splicing the running paper sheet or web unrolled from one paper roll supported by a paper roll supporting stand to the leading end of another paper roll which is also supported by said paper roll supporting stand and which has not yet unrolled, said paper roll diameter sensing device comprising:
    a guide roll adapted to rotate in contact with the running paper sheet or web unrolled from said one paper roll;
    first pulse generator means responsive to the rotation of said guide roll to generate one pulse for each rotation of said guide roll in the provision of a first pulse train having a pulse repetition rate indicative of a predetermined roll diameter at a given velocity of said web;
    second pulse generator means responsive to the rotation of said one paper roll to generate one pulse for each rotation of said one paper roll in the provision of a second pulse train having a pulse repetition rate indicative of the varying diameter of said one paper roll at said given velocity of said web; and
    electrical means responsive to said first and second pulse trains to generate an output signal when the pulse repetition rates of said first and second pulse trains are coincident, to indicate the reduction of the varying diameter of said one paper roll to said predetermined diameter, sid electrical means comprising a selector circuit means responsive to one of said first and second pulse trains to divide said one pulse train into an odd-numbered pulse train and an even-numbered pulse train, the pulses of which occur in regular sequential alternation one with the other, and to pass the other of said first and second pulse trains without any processing; and
    a discriminator circuit means responsive to said odd and even-numbered pulse trains and said other of said first and second pulse trains generating said output signal when the pulses in said respective pulse trains occur in a predetermined alternating sequence with one another over a predetermined consecutive number of pulses in said respective pulse trains, said predetermined alternating sequence occurring when the pulse repetition rate of said first pulse generator means coincides with that of said second pulse generator means.

4. The invention defined in claim 3, wherein said selector circuit means includes bistable switching means responsive to said one of said first and second pulse trains to provide said odd and even-numbered pulse trains; and wherein said discriminator circuit means comprises a logic network responsive to the order of occurrence of pulses in said respective odd and even-numbered pulse trains and said other of said first and second pulse trains to generate said output signal in response to said predetermined alternating sequence.

5. A paper roll diameter sensing device for use with paper splicing apparatus of the type splicing the running paper sheet or web unrolled from one paper roll supported by a paper roll supporting stand to the leading end of another paper roll which is also supported by said paper roll supporting stand and which has not yet unrolled, said paper roll diameter sensing device comprising:
- a guide roll adapted to rotate in contact with the running paper sheet or web unrolled from said one paper roll;
- first pulse generator means responsive to the rotation of said guide roll to generate one pulse for each rotation of said guide roll in the provision of a first pulse train having a pulse repetition rate indicative of a predetermined roll diameter at a given velocity of said web;
- second pulse generator means responsive to the rotation of said one paper roll to generate one pulse for each rotation of said one paper roll in the provision of a second pulse train having a pulse repetion rate indicative of the varying diameter of said one paper roll at said given velocity of said web; and
- electrical means responsive to said first and second pulse trains to generate an output signal when the pulse repetition rates of said first and second pulse trains are coincident, to indicate the reduction of the varying diameter of said one paper roll to said predetermined diameter, said electrical means comprising a selector circuit means responsive to said first and second pulse trains to divide said pulse trains into first and second sets of odd-numbered pulse trains and even-numbered pulse trains, respectively, the pulses of said first odd- and even-numbered pulse trains occurring in regular sequential alternation one with the other and the pulses of said second odd- and even-numbered pulse trains occurring in regular sequential alternaion one with the other; and
- a discriminator circuit means responsive to said sets of pulses trains generating said output signal when the pulses in said respective pulse trains occur in predetermined alternating sequences with one another over a predetermined consecutive number of pulses, said predetermined alternating sequences occurring when the pulse repetition rate of said first pulse generator means coincides with that of said second pulse generator means.

6. The invention defined in claim 5, wherein said selector circuit means includes first and second bistable switching means responsive, respectively, to said first and second pulse trains to provide, respectively, said first set of odd and even-numbered pulse trains and said second set of odd and even-numbered pulse trains; and
wherein said discriminator circuit means comprises a logic network responsive to the order of occurrence of predetermined pulses in said first and second sets of pulse trains to generate said output signal in response to said predetermined alternating sequences.

* * * * *